United States Patent
Dyas et al.

(10) Patent No.: US 6,504,494 B1
(45) Date of Patent: Jan. 7, 2003

(54) SOFTWARE, METHOD AND APPARATUS FOR RATE CONTROLLED IMAGE COMPRESSION

(75) Inventors: Robert M. Dyas, Naperville, IL (US); Bei Tang, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/993,803

(22) Filed: Nov. 6, 2001

(51) Int. Cl.$^7$ ............................. H03M 7/00; G06K 9/46
(52) U.S. Cl. ...................... 341/50; 382/253; 375/240.05
(58) Field of Search ............................. 341/50, 51, 61; 382/253, 248; 375/240.05; 358/447

(56) References Cited

U.S. PATENT DOCUMENTS

| | | | | |
|---|---|---|---|---|
| 5,343,539 A | * | 8/1994 | Chan ........................... | 382/253 |
| 5,594,554 A | * | 1/1997 | Farkash et al. .............. | 382/248 |
| 5,677,689 A | | 10/1997 | Yovanof et al. | |
| 5,790,269 A | * | 8/1998 | Masaki et al. ............... | 358/447 |
| 6,023,296 A | * | 2/2000 | Lee et al. ............... | 375/240.05 |
| 6,044,115 A | * | 3/2000 | Horiike et al. .......... | 375/240.05 |
| 6,282,322 B1 | * | 8/2001 | Rackett ....................... | 382/248 |

OTHER PUBLICATIONS

Masaki Nakagawa, Minoru Sasaki, Yoshiyuke Ishizawa, Yuichi Miyano, Mituo Yamazaki, Kazuo Konishi, Toshihiko Kaneshige, Shuichi Hisatomi; "DCT–Based Still Image Compression ICS with Bit–Rate Control"; *IEEE transactions on Consumer Electronics*, vol. 38, No. 3, Aug. 1992, pp. 711–717.

Abbas Razavi, Rutie Adar, Issac Shenberg, Rafi Retter, Rami Friedlander, "VLSI Implementation of an Image Compression Algorithm with a New Bit Rate Control Capability"; IEEE, 1992; pp. V–669–v–672.

Viresh Ratnakar and Miron Livny; "An Efficient Algoritm for Optimizing DCT Quantization", *IEEE Transactions on Image Processing*, vol. 9, No. 2, Feb. 2000; pp. 267–270.

* cited by examiner

Primary Examiner—Peguy Jeanpierre
Assistant Examiner—Jean Bruner Jeanglaude

(57) ABSTRACT

Method, software, and apparatus (100, 300, 400) for performing rate controlled image compression are provided. A quantization matrix scaling factor that results in compression to a predetermined byte size is determined by first summing the absolute value of the difference of neighboring pixels selected from a plurality of rectangular regions of the image. The sums are then input to a model function that is evaluated to obtain the quantization matrix scaling factor. According to preferred embodiments the model function involves a dot product operation between a vector that includes the sums and a second vector that includes region weights.

29 Claims, 6 Drawing Sheets

SOFTWARE, METHOD AND APPARATUS FOR RATE CONTROLLED IMAGE COMPRESSION

FIELD OF THE INVENTION

This invention pertains to image compression. More particularly this invention pertains to rate controlled lossy image compression.

BACKGROUND OF THE INVENTION

In recent years, there has been an increase in interest in electronic imaging. Digital cameras that obviate the need for film development and provide instant access to photographs have proliferated. In digital cameras, images may be stored in a compressed digital file format on a memory medium. One widely used compressed image file format is commonly known as JPEG, which is an acronym for Joint Photographic Expert Group. The JPEG standard is officially designated ISO/IEC 10928 and is a joint standard of the International Telecommunication Union and the International Organization for Standardization.

Broadly speaking, JPEG compression typically works by subjecting 8 by 8 blocks of each color component of an image to a two dimensional discrete cosine transform (DCT) to obtain 8 by 8 matrices of transformed image coefficients. Note that the latter step alone does not result in any byte size reduction. All but one of the 64 transformed image coefficients are then quantized using quantums stored in one or more 8 by 8 quantizing matrices. Separate quantization matrices may be provided for each color channel. In quantizing, each transformed image coefficient is divided by a corresponding quantum from one of the quantization matrices, and the remainder after division is discarded. Quantizing reduces the number of bits needed to record image information at the expense of some degree of precision. Analogously, if a decimal number is divided by 10 and the remainder discarded the number of digits is reduced by 1. If the quotient of a transformed image coefficient and a corresponding quantum is less than the quantum, the quotient is set to zero. The quantization process may result in a large number of the 8 by 8 transformed image coefficients, usually coefficients corresponding to high spatial-frequency components, being set to zero. Setting a large number of coefficients to zero also leads to a reduction of the number of bits need to record image information. The quantums in the quantization matrices are selected in view of understood limits of visual acuity so that file compression may be achieved without incurring great loss in perceived image quality. The first coefficient of each 8 by 8 matrix of transformed image coefficients represents the average over the 8 by 8 image block from which it was derived. Exploiting the fact that the average varies slowly, the first coefficients of successive 8 by 8 matrices of transformed image coefficients are differentially encoded.

After quantization, the quantized transformed image coefficients in each 8 by 8 block are read out in a zigzag pattern that proceeds from low spatial frequency to high spatial frequency. Such an ordering increases the likelihood of long runs of zero coefficients. The coefficients are subsequently entropy encoded in a way that exploits the long runs of zeros.

One property of JPEG image compression is that for a fixed input image size, the size of the resulting JPEG compressed file is dependent on the nature of the image. For images with more fine detail fewer transformed image coefficients are set to zero by the quantization step and larger compressed image files result.

In digital camera applications, it is desirable to be able to guarantee that a fixed number of images will fit on a digital memory medium of predetermined capacity. Also for limited bandwidth communication networks it is desirable to limit the byte size of image files.

What is needed is a method of image compression that insures that compressed image files are about a predetermined byte size, independent of the level detail in the input images.

BRIEF DESCRIPTION OF THE DRAWINGS

The features of the invention believed to be novel are set forth in the claims. The invention itself, however, may be best understood by reference to the following detailed description of certain exemplary embodiments of the invention, taken in conjunction with the accompanying drawings in which:

DETAILED DESCRIPTION OF THE PREFERRED EMBODIMENT

Figure 1:
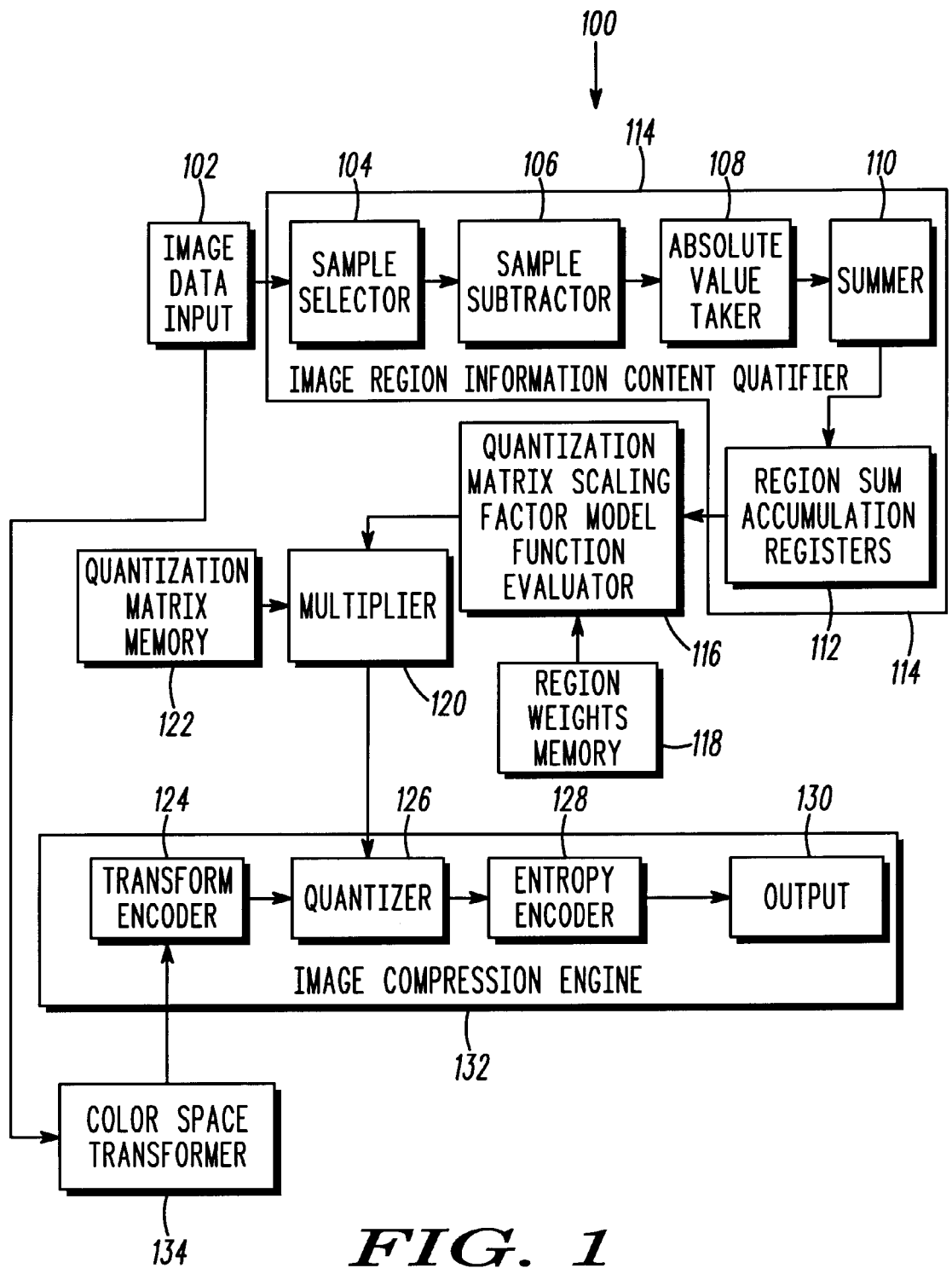
FIG. 1 is a functional block diagram of a rate controlled image compressor according to a preferred embodiment of the invention.

While this invention is susceptible of embodiment in many different forms, there are shown in the drawings and will herein be described in detail specific embodiments, with the understanding that the present disclosure is to be considered as an example of the principles of the invention and not intended to limit the invention to the specific embodiments shown and described. Further, the terms and words used herein are not to be considered limiting, but rather merely descriptive. In the description below, like reference numbers are used to describe the same, similar, or corresponding parts in the several views of the drawings.

Figure 3:
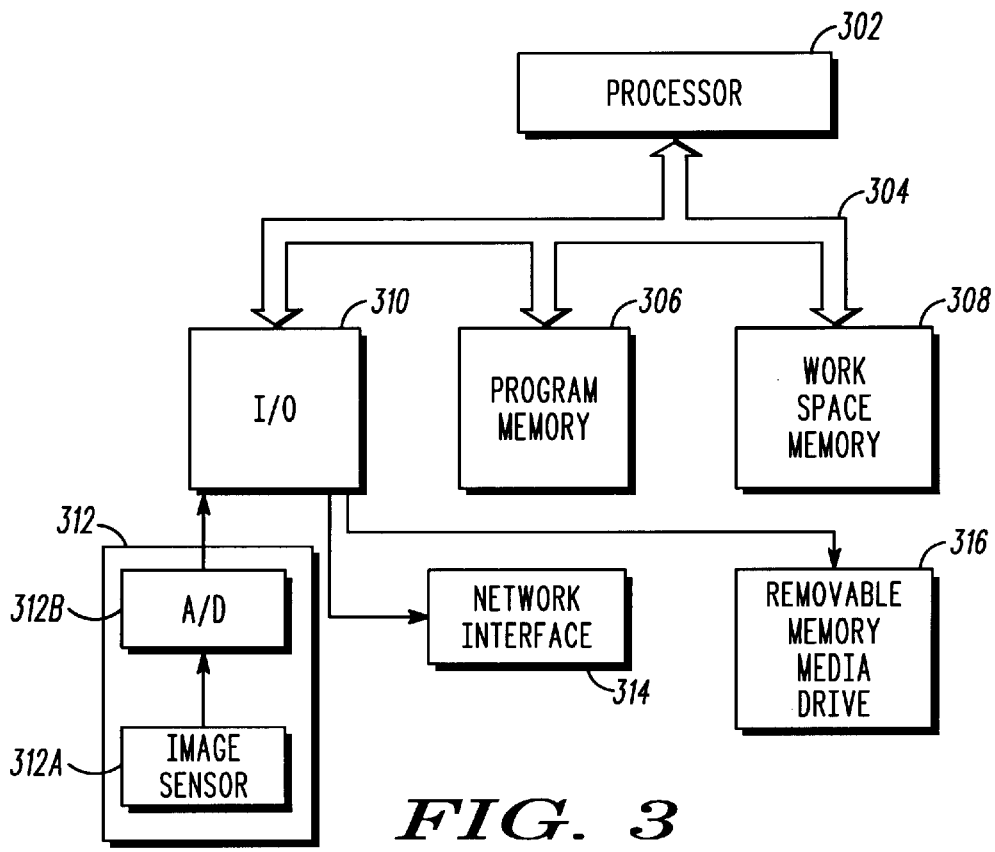
FIG. 3 is a hardware block diagram of an electronic apparatus that includes the rate controlled image compressor of FIG. 1.

FIG. 1 is a functional block diagram of a rate controlled image compressor 100 according to a preferred embodiment of the invention. Spatial domain image data is input at an image data input 102. The spatial domain image data may for example be received directly from an image sensor 312A (FIG. 3), from a network interface 314 (FIG. 3), or from a memory medium 318 (FIG. 3). The spatial domain image data preferably includes data from three primary color channels (e.g., red, green and blue color channels). Data from the three color channels may be interleaved as a consequence of an arrangement of color pixels in the image sensor 312A (FIG. 3) used to obtain the spatial domain image data.

Figure 2:
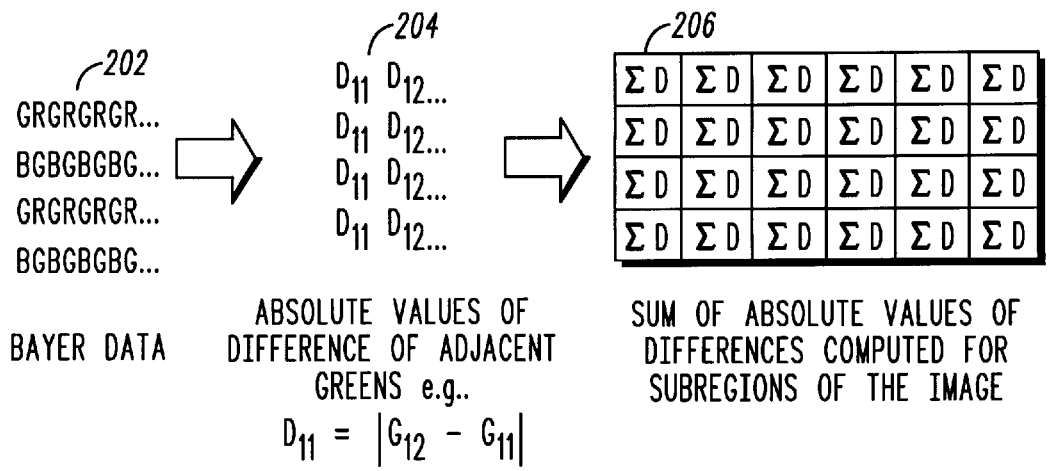
FIG. 2 is a diagram illustrating certain steps of deriving a measure of image information content according to the preferred embodiment of the invention.

Referring to FIG. 2 a diagram illustrating certain steps of a process of deriving a measure of image information content according to the preferred embodiment of the invention is shown. At the left-hand side of FIG. 2, an array of spatial domain image data 202 is represented. Each element in the array of spatial domain image data 202 is an unsigned number representing an amplitude of image information for a specific pixel. In the first line of the array 202 green pixel data represented by the letter G is interleaved with red pixel data represented by the letter R. Similarly in the second line green pixel data is interleaved with blue pixel data represented by the letter B. The overabundance of green pixel data arises from a design choice made in view of the fact that the sensitivity of the human eye to green light is greater than the sensitivity to either red or blue light.

Referring again to FIG. 1, a sample selector 104 is coupled to the image data input 102 for receiving the spatial domain image data. The sample selector 104 serves to select one or more subsets of the spatial domain image data 202. Preferably, the sample selector 104 selects one or more subsets of green spatial domain samples from the spatial domain image data. The preference for selecting green spatial domain samples is due to the fact that image luminance is most strongly dependent on green light intensity, and perceptible image information content is strongly correlated with variations in luminance. Preferably, the sample selector 100 selects all green spatial domain image data samples from the spatial domain image data. Alternatively, the sample selector 104 selects green samples from a plurality of rectangular regions of an image encoded in the spatial domain image data 202, wherein the plurality of rectangular regions taken together cover less than the entire image. According to a preferred form of the latter alternative embodiment the sample selector 104 selects samples from only one side of each image. By operating on data from selected image regions computational resources are conserved.

A sample subtracter 106 is coupled to the sample selector 104 for receiving the one or more subsets selected by the sample selector 104. The sample subtracter 106 serves to take the difference between pairs of spatial domain image samples received from the sample selector 104 and output a set of differences. Preferably, the subtracter 106 takes differences involving non-overlapping pairs of samples. In other words, each spatial domain image sample preferably appears in only one difference, and more preferably all of the samples selected by the sample selector 104 are included in a difference taken by the sample subtracter 106. Preferably, the differences involve adjacent green spatial domain image samples. Express symbolically, preferably differences of the form:

$$G_{I,J} - G_{I,J-1}$$

where

G is an indexed green spatial domain image sample;
the first index designates the row (or column) and the second index designates the column (or row) of the green spatial domain image sample; and
J is preferably either always odd or always even.

An absolute value taker 108 is coupled to the sample subtracter 106 for receiving the set of differences taken by the sample subtracter 106. The absolute value taker 108 takes the absolute value of differences taken by the sample subtracter 106 and outputs a set of absolute values. The absolute value taker 108 determines a magnitude of the difference between pairs of samples.

Referring to FIG. 2 an array of absolute values 204 of differences output by the absolute value taker 108 is shown.

Referring again to FIG. 1, a summer 110 is coupled to the absolute value taker 108. The summer 110 is also coupled to a plurality of sum accumulation registers 112. Preferably, each sum accumulation register 112 is dedicated to a particular rectangular image region. There are preferably from about 10 to about 60 rectangular image regions. Preferably, image area is divided both vertically and horizontally into rectangular regions. According to an exemplary embodiment image area is divided into a 4 by 6 array of 24 rectangular image areas. The summer 110 takes one or more sums over the set of absolute values or subsets of the set of absolute values. Preferably, the summer 110 sums absolute values over subsets corresponding to each of a plurality of rectangular image regions separately. The summer 110 preferably outputs a plurality of sums of absolute values of differences each corresponding to a particular rectangular region of the image encoded in the spatial domain image data. During the summing process, the sums are stored in the sum accumulation registers 112.

The sample selector 104, sample subtracter 106, absolute value taker 108, summer 110, and sum accumulation registers 112 are parts of an image region information content quantifier 114. The image region information content quantifier 114 serves to obtain measures that are indicative of the amount of image information content in subsets (e.g., rectangular regions) of the spatial domain image data and to varying degrees indicative of the perceptible image information content of the entire image encoded in the spatial domain image data. According to the preferred embodiment of the invention the sums stored in sum accumulation registers 112 are the aforementioned measures.

Referring to FIG. 2 a representation 206 of sums of absolute differences for a set of twenty four rectangular subregions of the image is shown.

Referring again to FIG. 1, a quantization matrix scaling factor model function evaluator 116 is coupled to the sum accumulation registers 112. The model function evaluator 116 accepts the sums of absolute differences as parameters and substitutes them into a function to be evaluated. The term function as used in this description includes mathematical functions that may be written in closed form, and program modules that return a value when called with one or more parameters. The model function evaluator 116 evaluates a function that models the dependence of the value of a quantization matrix scaling factor required to achieve image compression to about a predetermined file size, on the measures of perceptible image information content received from the image region information content quantifier. The model function evaluator 116 outputs a quantization matrix scaling factor calculated to achieve about a predetermined compressed file size when compressing the image encoded in the spatial domain image data. The quantization matrix scaling factor is a measure of an amount of perceptible image information. The quantization matrix scaling factor serves as a compression process control parameter.

Preferably, the model function evaluated by the function evaluator 116 takes into account the extent to which the sums of absolute difference for each region (e.g., rectangular region) is indicative of the perceptible image content of the image and, of greater practical importance, the degree of compression required to achieve the predetermined file size.

A region weight memory 118 is coupled to the model function evaluator 116 for supplying model function coefficients (e.g., a vector of rectangular image region weights)

According to the preferred embodiment of the invention the function evaluated in the model function evaluator 116 is a linear function of the form:

$$y = M \cdot X + b \quad \text{(EQUATION 1)}$$

where y is a quantization matrix scaling factor required to achieve compression to a predetermined file size;

X is a vector of measures of perceptible image information content corresponding to particular regions of the image, preferably, the sums of absolute values of differences for rectangular regions of the image output by the summer 110;

M is the vector of rectangular image region weights;

the dot between M and X denotes a dot product operation; and b is a predetermined constant offset.

Alternatively, in lieu of equation 1, another function F(X) of the measures of perceptible image information content may be used. For example a function of the form:

$$F(X) = \sum_{n=0}^{N} A_n [X]^n \quad \text{(EQUATION 1, alternative)}$$

where $[X]^n$ represents X dotted with itself n number of times;

$[X]_0$ is defined as 1; and $A_n$ is an nth coefficient vector.

For some alternatives to equation 1, it may be desirable to incorporate a look up table into the model function evaluator in order to reduce the computational cost of evaluating the function to be evaluated.

A multiplier 120 is coupled to the model function evaluator 116 for receiving the quantization matrix scaling factor. The multiplier 120 is also coupled to a quantization matrix memory 122. The quantization matrix memory 122 stores one or more quantization matrices. Preferably the quantization matrix memory 122 stores one quantization matrix for each of three primary color channels. The multiplier 120 serves to multiply matrix elements (quantums) of quantization matrices stored in the quantization matrix memory 122 by the quantization matrix scaling factor, and output one or more scaled quantization matrices. The scaled quantization matrices include resized quantums. Scaling the one or more quantization matrices effects the degree of compression that will be achieved when performing image compression. The multiplier is coupled to a quantizer 126 of an image compression engine 132.

The image compression engine 132 comprises a transform encoder 124 as a first stage. The transform encoder 124 is coupled to a color space transformer 134 that may be considered external to the compression engine 132. The color space transformer 134 is coupled to the image data input 102 for receiving red-green-blue spatial domain image data. The color space transformer 134 converts the primary color (red, blue, green) spatial domain image data to luminance-chrominance spatial domain image data. Luminance-chrominance spatial domain image data comprises a single luminance channel denoted Y and two chrominance channels denoted $C_B$ and $C_R$. According to an alternative embodiment of the invention, the color space transformer 134 is eliminated and the transform encoder 124 receives primary color spatial domain image data. According to another alternative embodiment of the invention, the sample selector 104 receives spatial domain image data from the color space transformer 134 and selects luminance samples instead of selecting green samples as discussed above. The transform encoder 124 projects the luminance and chrominance spatial domain image data received from the color space transformer 134 onto another basis and outputs a set of transformed image coefficients. Preferably the transform encoder 124 projects the spatial domain image data onto a spatial-frequency domain basis, more preferably the transform encoder 124 comprises a discrete cosine transformer (DCT) that projects spatial domain image data onto a discrete cosine basis. Alternatively, the transform encoder 124 projects the spatial domain image data onto a mixed spatial/spatial-frequency domain basis. For example according to a new image compression method known as JPEG2000 spatial domain data is projected onto a wavelet basis which is a mixed spatial/spatial-frequency domain basis.

The quantizer 126 is coupled to the transform encoder 124 for receiving the transformed image coefficients. Preferably, for each transformed image coefficient there is a quantum in the one or more scaled quantization matrices. The quantizer 126 serves to quantize the transformed image coefficients to produce a set of quantized transformed image coefficients. Quantizing is achieved by dividing each transformed image coefficient by a corresponding quantum in one of the scaled quantization matrices, and discarding the remainder. A higher quantization matrix scaling factor leads to larger quantums and in turn to a reduced bit length of quantized transformed image coefficients, and to a larger number of zero valued quantized transformed image coefficients.

An entropy encoder 128 is coupled to the quantizer 126 for receiving the set of quantized transformed image coefficients. Preferably the entropy encoder uses Huffman encoding. In preparation for Huffman encoding the quantized transformed image coefficients are preferably arranged in order from low spatial-frequency to high spatial-frequency. Such an ordering results in a long runs of zeros which are exploited in Huffman encoding. In Huffman encoding, symbols are assigned to various bit patterns (e.g. runs of zeros of a certain length) found in a bit stream that results from the aforementioned ordering, and binary sequences of varying length are assigned to these symbols in accordance with there prevalence in the bit stream. Shorter binary sequences are assigned to more common symbols. The entropy encoder is coupled to an output 130 for outputting a compressed image file of about a predetermined byte size.

The rate controlled image compressor 100 has the advantage that pre-existing image compression engines, e.g., ASIC based JPEG image compression chips may be used with little or no modification. The latter is due to the fact that only the quantization matrices used by the image compression engine 132 are altered.

FIG. 3 is a hardware block diagram of an electronic apparatus 300 that includes the rate controlled image compressor of FIG. 1. The electronic apparatus 300 includes a processor 302 for executing a program 400 (FIG. 4) that carries out rate controlled image compression according to the invention. The processor 302 is coupled to a digital signal bus 304. A program memory 306 is coupled to the digital signal bus 304. The program memory 306 is a form of computer readable medium. The program memory 306 is used to store a program 400 for performing rate controlled image compression.

A work space memory 308, e.g., RAM is coupled to the digital signal bus 304. The work space memory 308 is used by the processor 302 in executing programs.

An input/output (I/O) interface 310 is coupled to the digital signal bus 304. The input/output interface 310 is used to communicatively couple the processor 302 to peripheral electronics including an image sensor module 312, a network interface 314 and a removable memory media drive 316. The image sensor module 312 comprises an image sensor 312A, coupled to an analog to digital converter 312B. According to an alternative embodiment of the invention the program 400 (FIG. 4) is read through the removable memory media drive 316 from a removable memory medium 318.

Spatial domain image data is preferably read from the image sensor module 312 by the processor 302. The processor 302 then performs rate controlled image compression on the spatial domain image data, and either outputs compressed image data through the network interface 314, or writes compressed image data to the memory medium 318. Because the size of files resulting from rate controlled compression is approximately fixed, a predetermined number of images may be recorded on the removable memory medium 318 that has a fixed capacity. Alternatively, spatial domain image data is received via the network interface, 314 or read from the removable memory media drive 316. The network interface may for example comprise a wireless modem.

Figure 4:
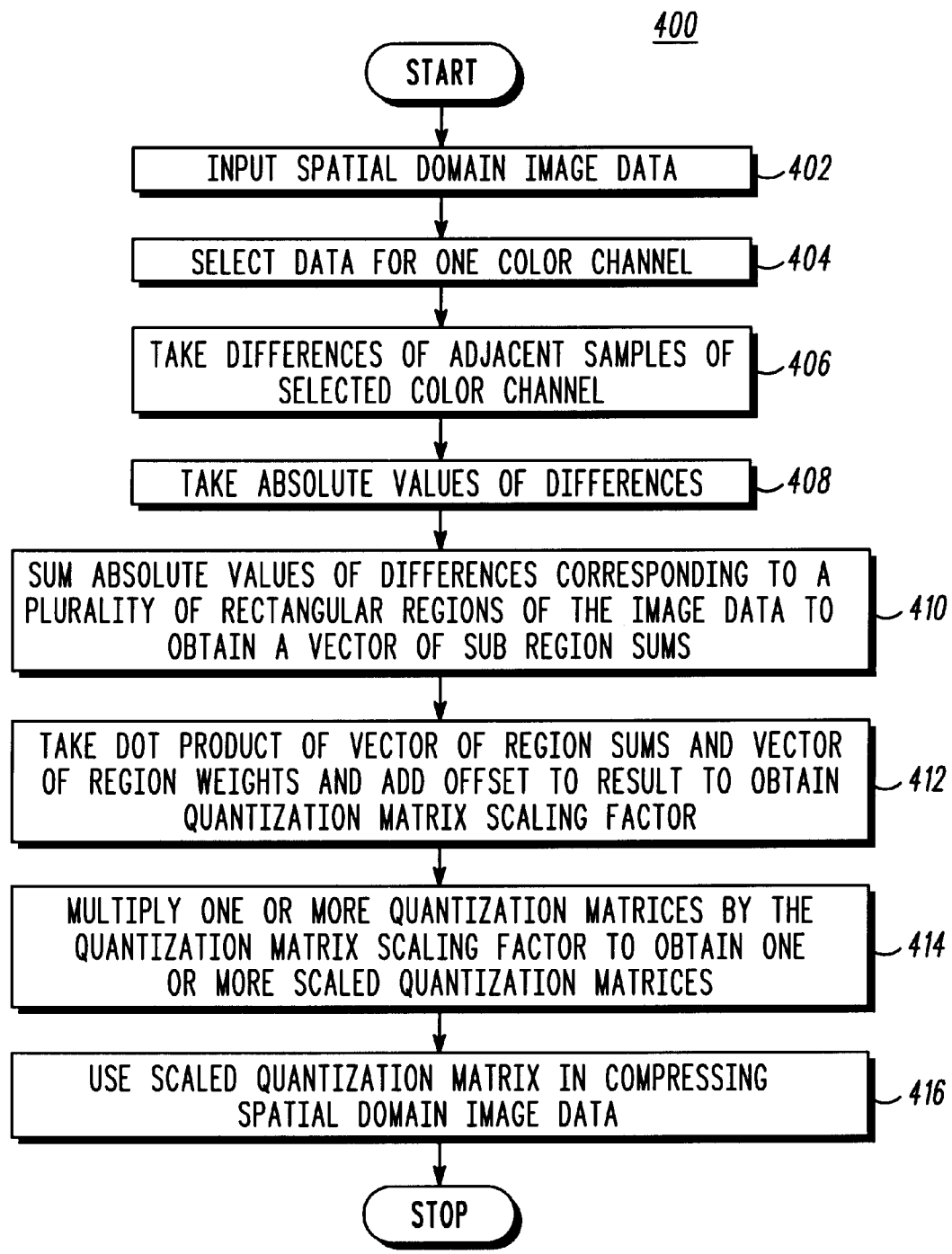
FIG. 4 is a flow chart of a program for performing rate controlled image compression according to the preferred embodiment of the invention.

FIG. 4 is a flow chart of the program 400 for performing rate controlled image compression according to the preferred embodiment of the invention.

In step 402 spatial domain image data is read. In step 404 spatial domain image data from a particular color channel (preferably green) is selected. In step 406 the differences between pairs of adjacent samples of the selected color channel are taken. In step 408 the absolute values of the differences taken in step 406 are taken. The successive operations of taking the difference between pairs of adjacent samples, and taking the absolute value of the resulting differences may be view as applying a composite function to pairs of samples. In step 410 the absolute values of the differences are summed over a plurality of rectangular regions of the spatial domain image data to obtain a vector of subregion sums. In step 412 a dot product operation is performed between the vector of subregion sums and a vector of region weights, and a predetermined constant offset is added to the result of the dot product operation to obtain a quantization matrix scaling factor. In performing the dot product operation each subregion sum is multiplied by a corresponding subregion weight to obtain a plurality of products, and the plurality of products are added together. In step 414 one or more quantization matrices (e.g., three separate quantization matrices for three color channels) are multiplied by the quantization matrix scaling factor to obtain one or more scaled quantization matrices. In step 416 the one or more scaled quantization matrices are used in compressing (e.g., JPEG encode) the spatial domain image data. A program for compressing the spatial domain image data using scaled quantization matrices is described below with reference to FIG. 7.

Figure 5:
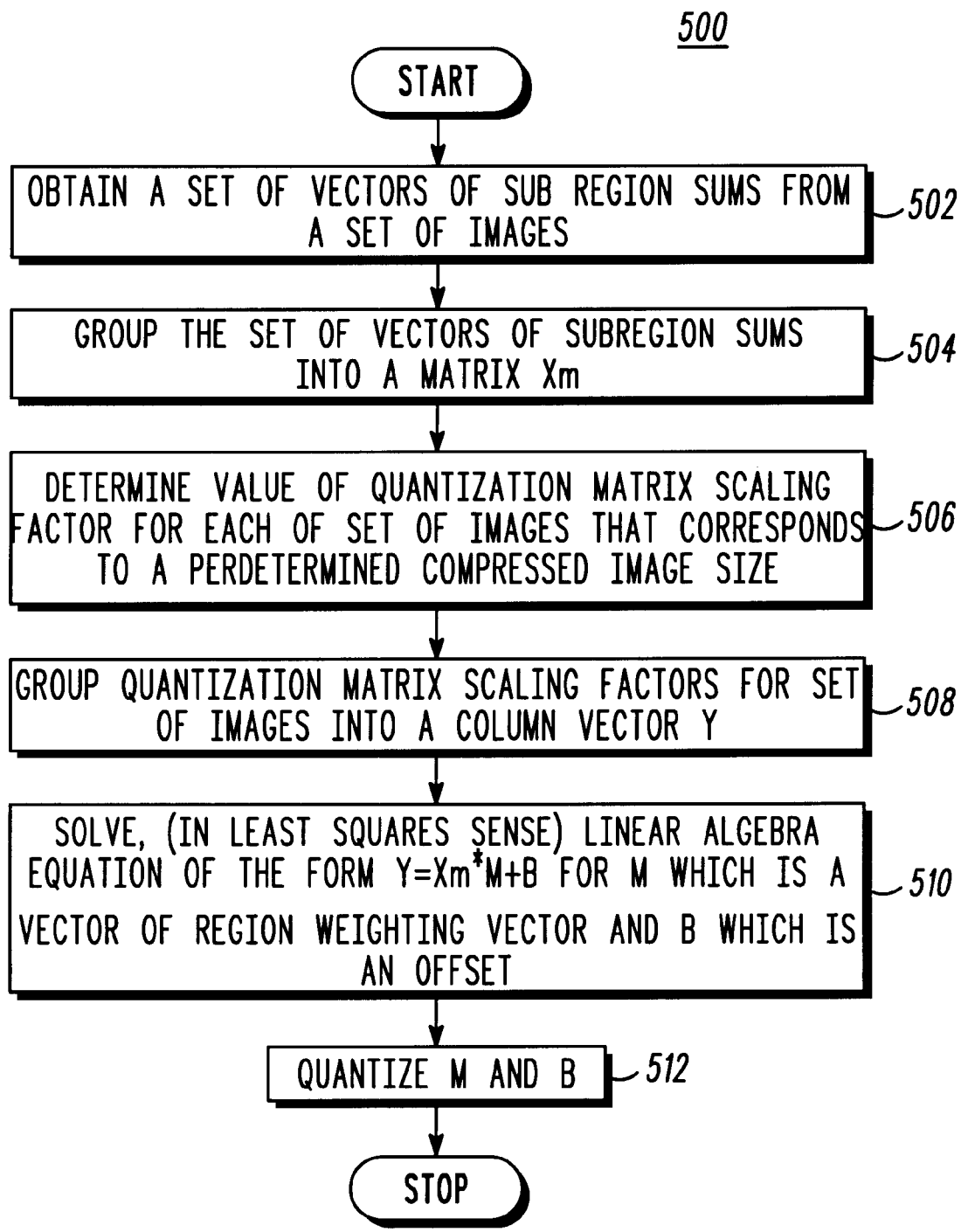
FIG. 5 is a flow chart of a program for determining region weights that are used in the program of FIG. 4.

FIG. 5 is a flow chart of a program 500 for determining region weights that are used in step 412 of program 400 shown in FIG. 4. Program 500 need only be run once to determine the region weights. Once the region weights have been determined they can be used by program 400 any number of times to perform rate controlled image compression.

In process block 502 a set of vectors of subregion sums is obtained from a set of images. Process block 502 preferably works by repeating steps 402 to 410 shown in FIG. 4 for each image in the set of images. In step 504 the set of vectors of subregion sums are grouped into a matrix denoted Xm. Each entry $Xm_{i,j}$ is described by a row index I that specifies a particular image among the set of image, and a column index J that denotes a particular subregion (e.g., rectangular subregion) of the images. The number of images in the set of images is preferably greater than the number of subregions, so that there are more rows in matrix X than columns.

In step 506 the value of the quantization matrix scaling factor that results in a preselected compressed file size is determined for each of the set of images by a method other than that described above. A method for carrying out step 506 using a bisection method is described in more detail below with reference to FIG. 6. Alternatively step 506 is carried out by trying a number of different quantization matrix scaling factors until one is found that yields the desired file size. In step 508 the quantization matrix scaling factors for the set of images, as determined in step 506 are arranged in a column vector denoted Y. Each entry $Y_i$ of the column vector Y is identified by the index i that specifies a particular image among the set of images.

In step 510 a linear algebra equation of the following form is solved by linear regression:

$$Y = Xm * M + B \qquad \text{(Equation 2)}$$

where

Y is the column vector created in step 508;

Xm is the matrix created in step 504;

B is a unknown constant offset to be determined by solving the linear algebra equation; and M is a vector of unknown region weights to be determined by solving the linear algebra equation.

The solution set obtained describes a hyperplane that best fits Y and Xm in a least squares sense. In step 512 the constant B and the region weights in M that were determined in step 510 by solving equation 2 are quantized to a fixed binary precision. Quantizing M and B facilitates evaluating equation 1 especially if the function evaluator 116 is only capable of binary shifts (equivalent to multiplication by a factor that is a power of two) and binary adds.

The set of images obtained in step 502 preferably include images that are representative of a type of image that is to be compressed by the rate controlled compression techniques described above. If the type of images with which a particular rate controlled image compression is to be used is unspecified, then the set of images obtain in step 502 preferably comprises a wide variety of different images e.g., landscape, cityscape, indoor and portrait images. By solving the linear algebra equation, the degrees to which the sums of absolute differences for the various image regions of images are in general indicative of the perceptible image information content for images are determined. Of greater practical importance, the degrees to which the sums of absolute values for the various image regions are in general indicative of the quantization matrix scaling factor required to achieve a given compressed file size are also determined.

It may be desirable to run program 500 multiple times using a number of preselected file sizes in order to determine a number of sets of region weights that are suitable for achieving compression to each of the number of preselected file sizes.

Figure 6:
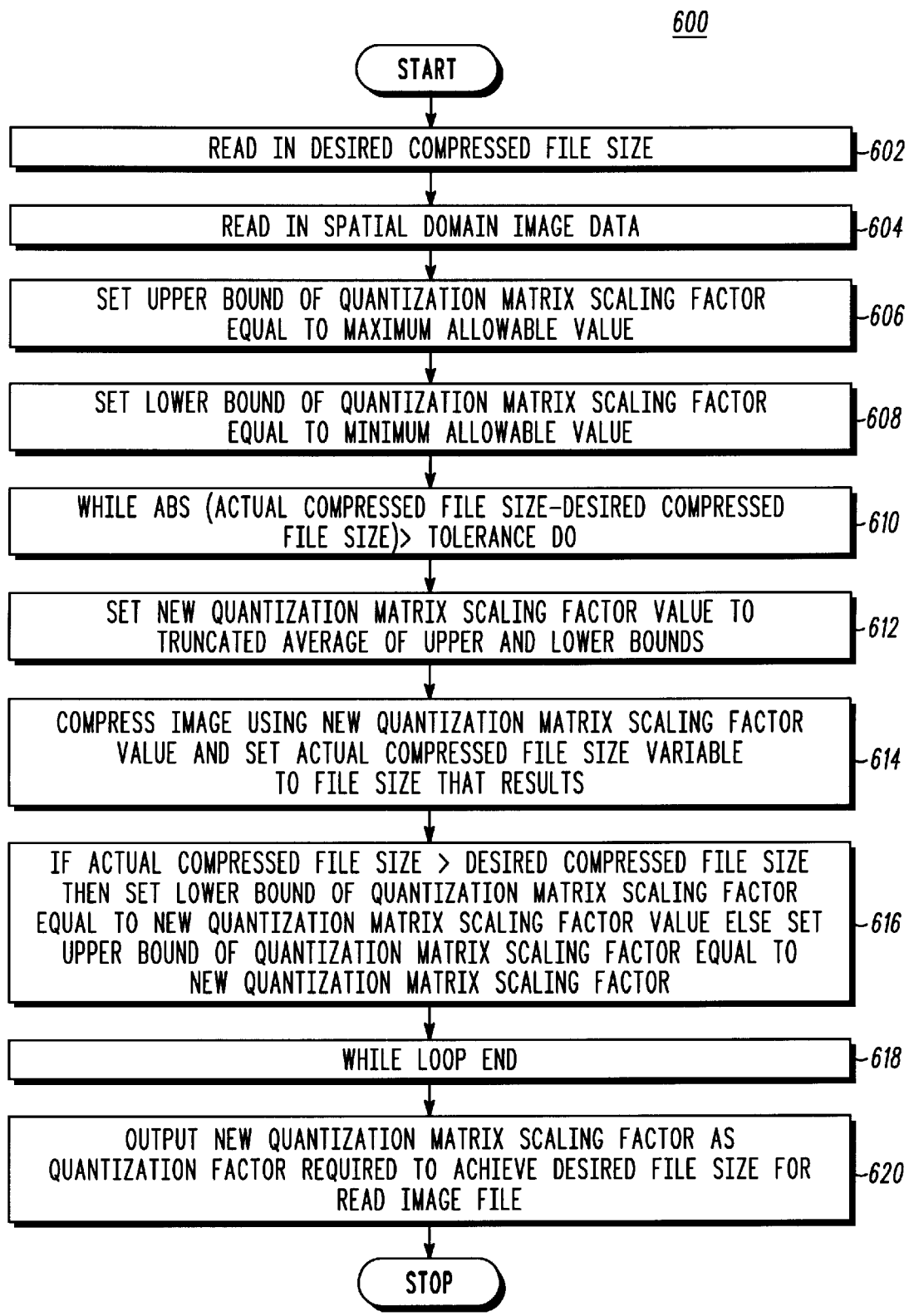
FIG. 6 is a flow chart of a program for determining a quantization matrix scale factor required to compress a file to about a predetermined size for use in the program of FIG. 5.

FIG. 6 is a flow chart of a program 600 for determining a quantization matrix scale factor required to compress a file to about a predetermined size for use in program 500. The program 600 implements a bisection method in which the quantization matrix scaling factor is treated as the independent variable, and compressed file size is treated as the dependent variable. The method embodied in program 600 is far more computationally expensive than the method described above with reference to FIG. 4. The program 600 is only used for the purpose of finding quantization scale factors for use in program 500, so that region weights used in program 400 may be found by executing program 500. Program 600 is too computationally expensive to be a practical substitute for program 400.

In step 602 a desired compressed file size is read in. In step 604 spatial domain image data of an image (e.g., one of the set of images used by program 500) is read in. In step 606 an upper bound of the quantization matrix scale factor is set equal to a predetermined maximum allowable value for the quantization matrix scale factor. The maximum allowable value is no more than maximum possible value of transformed image coefficients. In step 608 a lower bound of the quantization matrix scale factor is set equal to the minimum possible value of the quantization matrix scale factor. The minimum possible value of the quantization matrix scale factor is unity.

Process block 610 is the beginning of a DO WHILE loop that is executed until the absolute value of the difference between an actual compressed file achieved and the desired compressed files size is less than a predetermined tolerance. The loop condition is evaluated after passing through the loop. In step 612 a new quantization matrix scaling factor variable is set equal to the truncated average of the upper and lower bounds of the quantization matrix scaling factor. In step 614 the image encoded in the spatial domain image data is compressed using the new quantization scaling factor, and the actual compressed file size is set to the resulting file size.

Process block 616 is an IF-THEN-ELSE block. In process block 616 if the actual compressed files size is greater than the desired compressed file size then the lower bound of the quantization matrix scale factor is set equal to the new quantization scale factor. Otherwise the upper bound of the quantization matrix scale factor is set equal to the new quantization matrix scale factor. Process block 618 ends the DO WHILE loop begun in process block 610. The DO WHILE loop continues until the actual file size achieved is within the predetermined tolerance of the desired file size.

In step 620 the new quantization matrix scaling factor is output as the quantization matrix scaling factor required to achieve about the desired file size for the spatial domain image data read in step 604.

Figure 7:
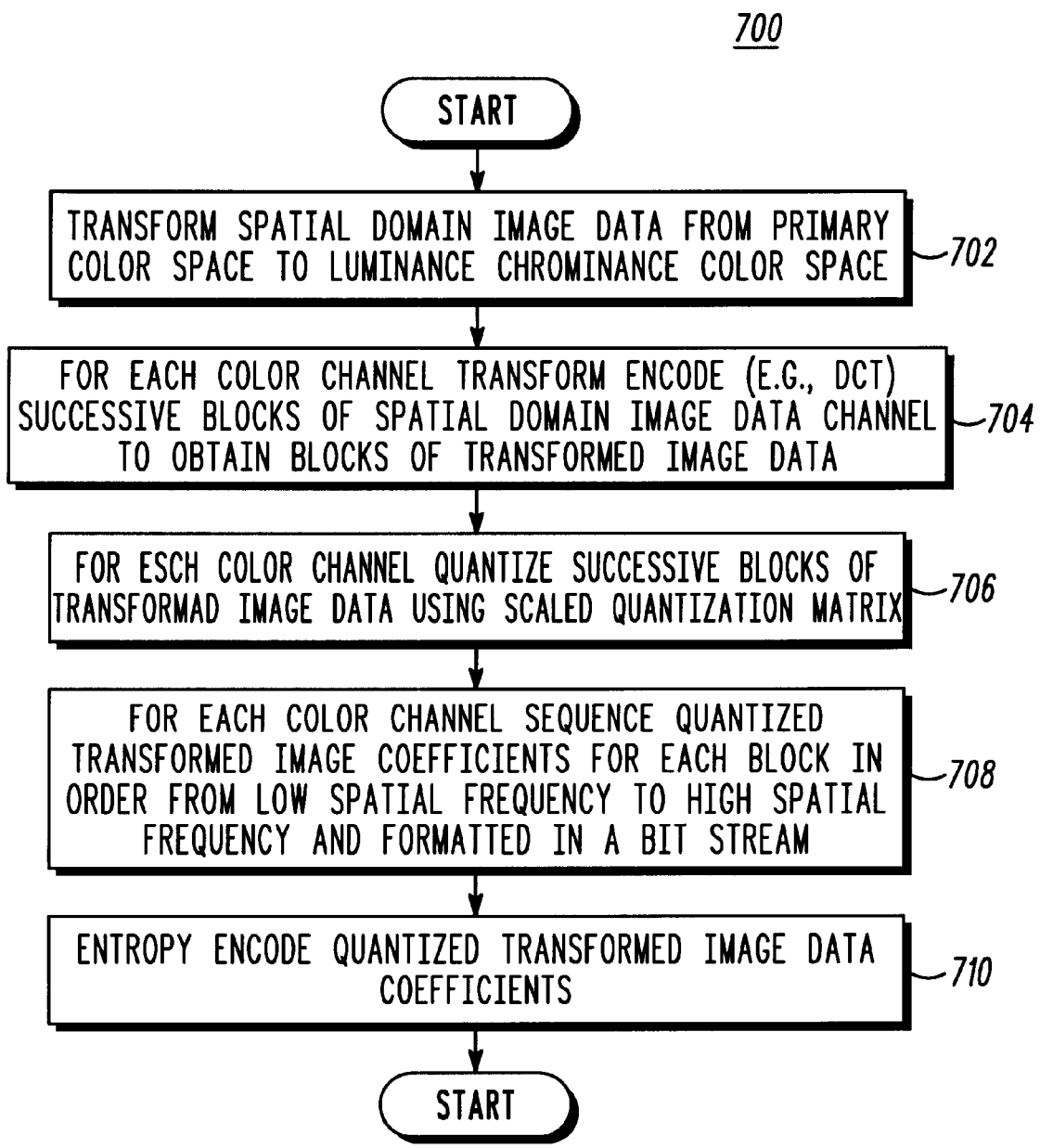
FIG. 7 is a flow chart of a program for compressing an image using scaled quantization matrices according to the preferred embodiment of the invention.

FIG. 7 is a flow chart of a program 702 for compressing an image using scaled quantization matrices according to the preferred embodiment of the invention. In step 702 spatial domain image data is transformed from a primary color space (i.e., red, blue, green) to a luminance-chrominance color space. According to an alternative embodiment of the invention step 702 is eliminated. In step 704 for each color channel, successive blocks (e.g., 8 by 8 blocks) of spatial domain image data are transform encoded (e.g., projected onto a spatial-frequency domain) to obtain blocks of transformed image data. In step 706, for each color channel successive blocks of transformed image data are quantized using quantums of a scaled quantization matrix for the color channel. In step 708 for each color channel quantized transformed image coefficients for each block are sequenced in order from low spatial frequency to high spatial frequency and formatted in a bit stream. Alternatively, the order is reversed. In step 710 the bit stream including the quantized transformed image coefficients is entropy encoded.

The invention provides a computationally inexpensive, method of determining a quantization matrix scaling factor required to achieve compression to a predetermined size.

As will be apparent to those of ordinary skill in the pertinent arts, the invention may be implemented in hardware or software or a combination thereof. Programs embodying the invention or portions thereof may be stored on a variety of types of computer readable media including optical disks, hard disk drives, tapes, programmable read only memory chips. Network circuits may also serve temporarily as computer readable media from which programs taught by the present invention are read.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method of image compression comprising the steps of:

reading a set of spatial domain image samples;

selecting at least one subset of the set of spatial domain image samples;

evaluating a first function that depends on a magnitude of a difference between two spatial domain image samples for a plurality of pairs of image samples selected from the at least one subset to obtain a plurality of first function values for each of the at least one subset;

summing the plurality of first function values to obtain a sum for each of the at least one subset;

substituting the sum for each of the at least one subset into a second function;

evaluating the second function to obtain a measure of an amount of perceptible image information; and employing the measure to control the operation of an image compressor.

2. The method of claim 1 wherein the step of employing the measure to control the operation of an image compressor comprises the substep of:

adjusting one or more quantums based on the measure to obtain one or more resized quantums;

transform encoding at least a subset of set spatial domain image samples to obtain a set of transformed image coefficients; and quantizing one or more of the transformed image coefficients using the one or more resized quantums.

3. The method of claim 1 wherein the step of selecting at least one subset comprises the substep of:

selecting a plurality of subsets of the set of spatial domain image samples.

4. The method of claim 3 wherein the substep of selecting a plurality of subsets comprises the substep of:

selecting the plurality of subsets of the set of set of spatial domain image samples wherein each subset includes samples taken from a rectangular region of an image.

5. The method of claim 3 wherein the step of evaluating the second function comprises the substeps of:

multiplying the sum for each of the at least one subset by a weight to obtain a plurality of products; and adding the plurality of products to obtain a product sum.

6. The method of claim 5 wherein the step of evaluating the second function further comprises the substep of:

adding a predetermined constant to the product sum.

7. The method of claim 5 wherein the step of evaluating the first function comprises the substeps of:

subtracting a first plurality of spatial domain image samples from a second plurality of spatial domain image samples to obtain a plurality of differences; and applying an absolute value operation to each of the plurality of differences to obtain a plurality of absolute values.

8. The method of claim 7 wherein the step of employing the measure comprises the substep of:

adjusting one or more quantums based on the measure to obtain one or more resized quantums;

transform encoding at least a subset of set spatial domain image samples to obtain a set of transformed image coefficients; and quantizing one or more of the transformed image coefficients using the one or more resized quantums.

9. The method of claim 1 wherein the step of evaluating the first function comprises the substeps of:

subtracting a first plurality of spatial domain image samples from a second plurality of spatial domain image samples to obtain a plurality of differences; and applying an absolute value operation to each of the plurality of differences to obtain a plurality of absolute values.

10. A method of image compression comprising the steps of:

reading a set of spatial domain image samples of an image;

applying one or more first functions to each of a plurality of subsets of the set of spatial domain image samples to obtain a plurality of measures of subset image information content wherein the plurality of measures of subset image information content includes at least one measure of subset image content for each of the plurality of subsets;

substituting the plurality of measures of subset image information content into a second function; and evaluating the second function to obtain a measure of image information content for the entire image.

11. The method according to claim 10 wherein:

each subset of spatial domain image samples is taken from a first side of the image.

12. The method according to claim 11 wherein:

each subset corresponds to one of a plurality of rectangular regions of the image.

13. The method according to claim 12 wherein the step of evaluating the second function comprises the substeps of:

multiplying each of the plurality of measures of subset image information content by one of a plurality of image region weights.

14. The method according to claim 13 further comprising the steps of:

adjusting one or more quantums based on the measure of image information content to obtain one or more resized quantums;

transform encoding at least a subset of set spatial domain image samples to obtain a set of transformed image coefficients; and quantizing one or more of the transformed image coefficients using the one or more resized quantums.

15. A method for determining the extent to which information content in each of a plurality of subregions of an image is indicative of image information content for the entire image, the method comprising the steps of:

determining a level of compression required to achieve a files size of about a predetermined file size for each of a set of image files so as to obtain a vector of numbers wherein each number is indicative of the levels of compression for one of the set of image files;

obtaining a plurality of measures of image information content including one measure for each of the plurality of subregions for each of the set of image files;

arranging the plurality of measures in a matrix according to image file and according to subregion; and solving a matrix equation involving the vector of numbers, the matrix, and a vector of unknowns.

16. The method according to claim 15 wherein:

the step of arranging the plurality of measures in the matrix comprises the substeps of:

placing measures of information content for each image in a row; and placing measures of information content for each subregion in a column; and the step of solving the matrix equation comprises the substeps of:

solving a matrix equation that includes:

a first side that includes the vector of numbers; and a second side that includes the matrix multiplied by the vector of unknowns.

17. A rate controlled image compressor comprising:

image region information content quantifier for determining a plurality of measures of perceptible image information content corresponding to a plurality of regions of an image;

a function evaluator for calculating a compression control parameter based on the plurality of measures of image information content; and an image compression engine for compressing the image using one or more parameters derived from the compression control parameter.

18. The rate controlled image compressor according to claim 17 wherein the image region information content quantifier comprises:

a sample selector for selecting a subset of spatial domain image samples of the image;

a sample subtracter for subtracting a plurality of spatial domain samples in the subset from a plurality spatial domain samples in the subset to obtain a plurality of differences;

an absolute value taker for taking absolute values of the plurality of differences to obtain a plurality of absolute values; and a summer for separately summing the plurality of absolute values over each of the plurality of regions of the image to obtain the plurality of measures of image information content.

19. The rate controlled image compressor according to claim 17 further comprising:

a multiplier for multiplying a quantization matrix by the compression control parameter to obtain a scaled quantization matrix; and wherein:

the function evaluator comprises:

a quantization matrix scaling factor function evaluator; and the image compression engine comprises:

a quantizer for quantizing information derived from the image using the scaled quantization matrix.

20. The rate controlled image compressor according to claim 19 wherein:

the function evaluator is adapted to perform a dot product operation between the plurality of measures of image information content and a plurality of region weights.

21. A computer readable medium containing programming instructions for image compression, the computer readable medium including programming instructions for:
   reading a set of spatial domain image samples of an image;
   selecting a plurality of subsets of the set of spatial domain image samples;
   applying one or more first functions to each of the plurality of subsets to obtain a plurality of measures of subset image information content wherein the plurality of measures of subset image information content includes at least one measure of subset image information content for each of the plurality of subsets;
   substituting the plurality of measures of subset image information content into a second function; and
   evaluating the second function to obtain a measure of image information content for the entire image.

22. The computer readable medium according to claim 21 wherein the programming instructions for selecting a plurality of subsets consist of programming instructions for:
   selecting a subset that corresponds to each of a group of rectangular regions of an image that are located on a first side of the image.

23. The computer readable medium according to claim 22 wherein the programming instructions for selecting a plurality of subsets comprise programming instructions for:
   selecting a subset that corresponds to each of a plurality of rectangular regions of the image.

24. The computer readable medium according to claim 23 wherein the programming instructions for evaluating the second function programming instructions for:
   multiplying each of the plurality of measures of image information content by one of a plurality of image region weights.

25. The computer readable medium according to claim 24 further comprising programming instructions for:
   adjusting one or more quantums based on the measure of image information content to obtain one or more resized quantums;
   transform encoding at least a subset of set spatial domain image samples to obtain a set of transformed image coefficients; and
   quantizing one or more of the transformed image coefficients using the one or more resized quantums.

26. An electronic apparatus comprising:
   an image data input;
   a processor coupled to the image data input for receiving image data therefrom;
   a memory coupled to the processor for storing programming instructions for execution by processor, including programming instructions for:
      reading a set of spatial domain image samples from the image data;
      applying one or more first functions to each of a plurality of subsets of the set of spatial domain image samples to obtain a plurality of measures of subset image information content wherein the plurality of measures of subset image information content includes at least one measure of subset image information content for each of the plurality of subsets;
      substituting the plurality of measures of subset image information content into a second function; and
      evaluating the second function to obtain a measure of image information content for the entire image.

27. The electronic apparatus according to claim 26 wherein:
   each of the plurality of subsets corresponds to one of a plurality of rectangular regions of the image data.

28. The electronic apparatus according to claim 27 wherein the programming instructions for evaluating the second function programming instructions for:
   multiplying each of the plurality of measures of subset image information content by one of a plurality of image region weights.

29. The electronic apparatus according to claim 28 further comprising programming instructions for:
   adjusting one or more quantums based on the measure of image information content to obtain one or more resized quantums;
   transform encoding at least a subset of set spatial domain image samples to obtain a set of transformed image coefficients; and
   quantizing one or more of the transformed image coefficients using the one or more resized quantums.

* * * * *